Patented Mar. 9, 1926.

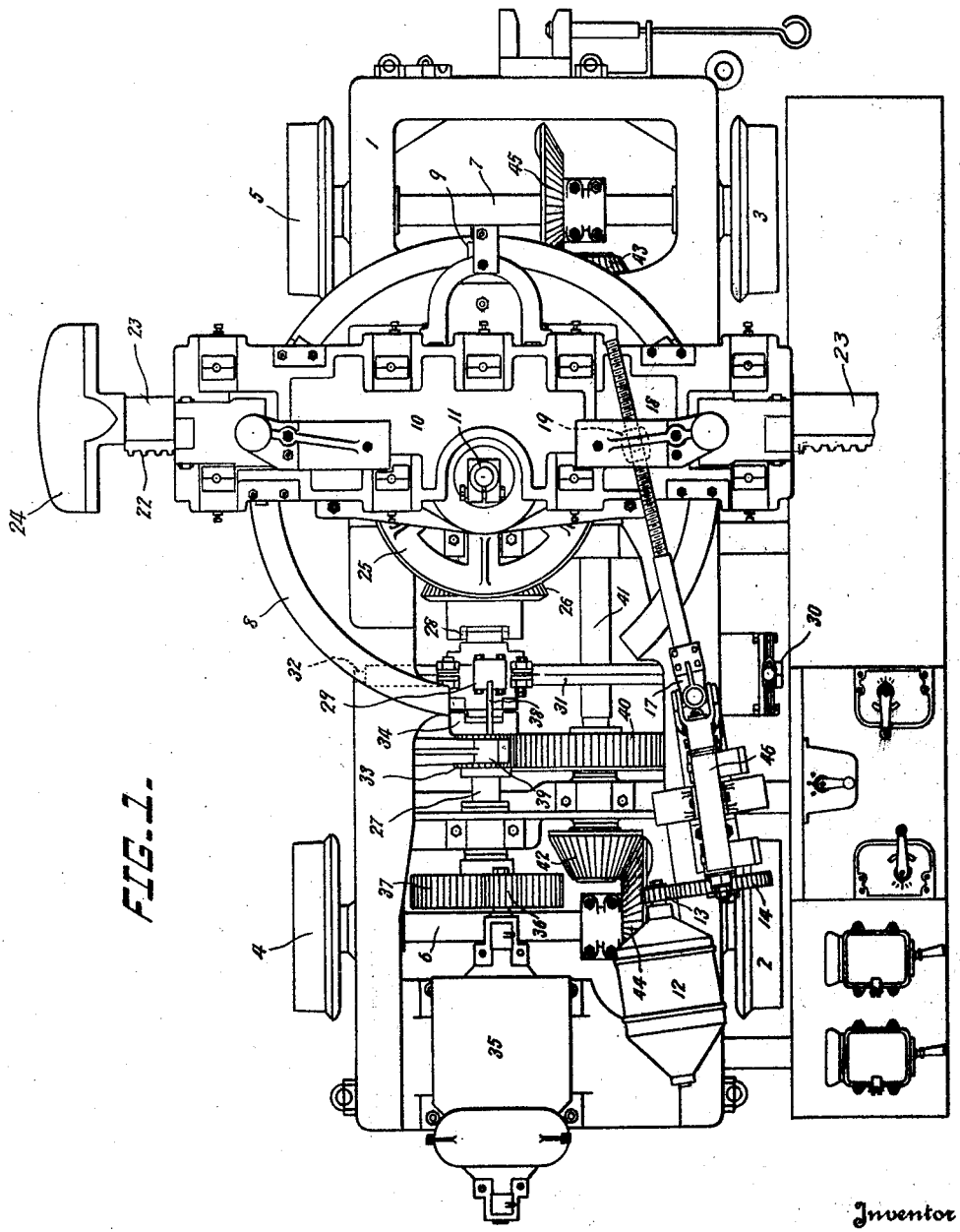

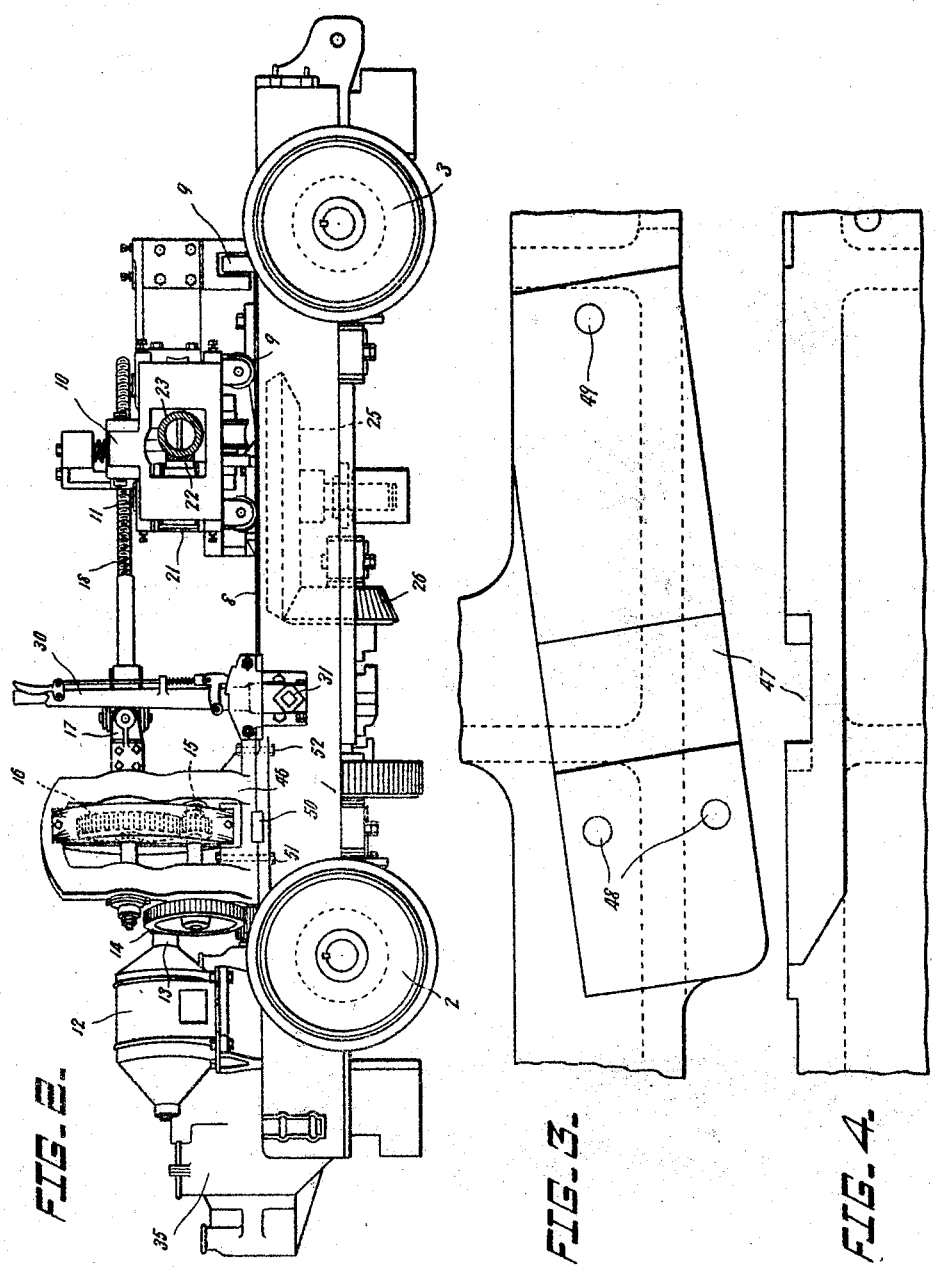

1,576,132

UNITED STATES PATENT OFFICE.

GEORGE M. BOOKMAN, OF MALLOW, VIRGINIA, ASSIGNOR TO COVINGTON MACHINE COMPANY, INC., OF COVINGTON, VIRGINIA, A CORPORATION OF VIRGINIA.

CLINKER EXTRACTOR.

Application filed September 3, 1925. Serial No. 54,208.

*To all whom it may concern:*

Be it known that I, GEORGE M. BOOKMAN, a citizen of the United States, residing at Mallow, in the county of Alleghany and State of Virginia, have invented new and useful Improvements in Clinker Extractors, of which the following is a specification.

This invention relates to machines for extracting clinker or other material from furnaces, ovens, retorts, etc., and comprises all improvements over the prior art which are disclosed in this application. One object is to provide mechanism for swinging the ram carriage in either of two directions about a pivot, which will be able to stand up effectively for a long period of time without becoming loose and interfering with the accurate and rigid positioning of the ram carriage in any of its angular positions. The mechanism used for producing this swinging adjustment, preferably comprises a reversible motor having a gear in mesh with one of a train of gears mounted on a gear stand, the last gear of the train having its shaft connected by a universal joint to a screw engaging a nut pivoted on the ram carriage. The thrust necessary to position the ram carriage angularly and to hold it rigidly while the shovel is digging the clinker loose, is transmitted through the screw to the gear stand. The problem of rigidly and permanently fastening the gear stand to the supporting frame of the machine has proved to be very difficult of solution. In spite of repeated efforts to fasten the gear stand by more bolts, and larger bolts, the gear stand would work loose. Finally after much thought and experiment, it was found that by providing a wide key between the gear stand and supporting frame to take the principal thrust, a rigid permanent connection was obtained, bolts being relied on principally to hold the gear stand and frame together in a direction at right angles to the thrust on the key.

The above and other objects which will hereinafter appear, are attained by new and useful improvements as disclosed in this application. To enable others skilled in the art to fully understand the essential features of the improvements, drawings have been annexed as a part of this disclosure.

Fig. 1 is a plan view of the clinker extractor.

Fig. 2 is a side elevation of the clinker extractor.

Fig. 3 is a plan view of a portion of the supporting frame showing the keyway in same.

Fig. 4 is an elevation of Fig. 3.

The extractor comprises a frame 1 mounted upon wheels 2, 3, 4, 5 which are keyed upon axles 6, 7, journalled in opposite sides of frame 1.

Formed on the top of the frame 1 is a ring track 8 on which travels the supporting rollers 9 of ram carriage 10 which is swiveled on vertical shaft 11. Electric motor 12 is fastened to frame 1 and acts through gearing 13, 14, 15, 16, universal joint 17, screw 18, and nut 19 pivoted to ram carriage 10, to swing the ram carriage in either direction about shaft 11 as a pivot, by causing the motor to rotate in either direction by known electric control devices.

Keyed on shaft 11 is a pinion 21 meshing with rack 22 on ram bar 23 carrying shovel 24. Also keyed on shaft 11 below the top of the frame 1 is a large bevel gear 25 meshing with bevel pinion 26 which freely turns on shaft 27 and has clutch teeth 28. Splined on shaft 27 is a clutch 29 having clutch teeth on its opposite sides and being adapted to be slid in opposite directions on shaft 27 by means of clutch lever 30 swinging a bar 31 which passes through clutch 29 and fits loosely in a socket 32 in frame 1. Pinion 33 is free on shaft 27 and has clutch teeth 34. Electric motor 35 rotates shaft 27 through gears 36, 37. By moving the clutch 29 toward pinion 33, the clutch slides under and raises the lifting bar 38 projecting from the brake dog 39, thus lifting brake dog 39 out of locking engagement with pinion 33. By moving clutch 29 further until its clutch teeth engage clutch teeth 34, pinion 33 is rotated, and hence gear 40, keyed on shaft 41 is rotated and through bevel pinions 42, 43, on opposite ends of shaft 41, bevel gears 44, 45, are rotated and rotate axles 6, 7, and consequently wheels 2, 3, 4, 5, to move the machine along a track. Motion in either direction is obtained by reversing motor 35 in a well known manner. By shifting clutch 29 in the opposite direction, lifting bar 38 is released to permit brake dog 39 to fall into engagement with the teeth of pinion 33 to hold the machine in position where it is placed. By shifting the clutch still further, it engages clutch teeth 28 on bevel pinion 26 and through bevel gear 25, shaft 11, and pinion 21 and rack 22, operates ram bar 23 laterally of the machine. Reciprocating movement of ram bar 23 is obtained by reversing motor 35. The ram bar is held and guided by rollers in a manner broadly similar to that disclosed in Patent 768,067, to McConnell. Thus by the mechanism described, the machine can be shifted along a track to any position desired. The ram carriage can also be swiveled about shaft 11 to any angle desired, and the shovel can be reciprocated into and out of a furnace opening.

In efforts to permanently and rigidly fasten the gear stand 46 to the frame 1, a problem of great difficulty was encountered. After repeated unsuccessful efforts and much study, the following construction was finally found to be effective. The bottom of the gear stand 46 is provided with a slot similar in size to slot 47 in the top of frame 1. Bolt holes are provided in gear stand 47 similar to bolt holes 48, 49 in frame 1. The gear stand is placed in position, and key 50, which is preferably more than twice as wide as it is thick, is placed in position. Bolts 51, 52, are passed through holes 48, 49, to firmly secure the gear stand to the frame 1. The relatively wide key 50 serves to effectively take the extremely severe thrust and pull which comes on the gear stand through screw 11 during the normal operation of the machine while extracting clinker.

All changes which properly come within the spirit and range of equivalency of the following claims are intended to be embraced within the scope of the claims.

I claim:

1. In a machine for extracting clinker and the like, a frame, a carriage swingably mounted on the frame, a stand secured to the frame, a power means connecting said stand and said carriage and adapted to swing said carriage in opposite directions, and a key interengaging said frame and said stand.

2. The machine set forth in claim 1 in which the width of the key is considerably greater than its thickness.

3. The machine set forth in claim 1 in which the width of the key is more than twice its thickness.

4. The machine set forth in claim 1 in which the stand is secured to the frame by bolt means on each side of said key.

5. The machine set forth in claim 1 in which the power means comprises a rotatable rod.

G. M. BOOKMAN.